Jan. 23, 1940.    H. M. ZSCHAU    2,188,170
ARMATURE
Filed May 22, 1939

Inventor
Hugo M. Zschau
BY
Parker, Carlson
Pitzner + Hubbard.
Attorneys.

Patented Jan. 23, 1940

2,188,170

UNITED STATES PATENT OFFICE 2,188,170

ARMATURE

Hugo M. Zschau, Chicago, Ill., assignor to Wodack Electric Tool Corporation, Chicago, Ill., a corporation of Illinois Application May 22, 1939, Serial No. 274,905

4 Claims. (Cl. 171—206)

The invention relates to improvements in rotatable armatures for dynamo electric machines such as motors or generators.

A problem which is frequently troublesome in dynamo electric machines is the breakage of the so-called end connections which extend from the armature windings to its rotary connecter such as a commutator or slip rings. The usual practice is to lead these end connections in a cylindrical bundle, coaxial with the armature, from the windings to the rotary connecter which is carried at one end of the armature. Heretofore, various forms of bindings or circumferential retainers have been used to hold the bundle of end connections against radial displacement during rotation of the armature. In view of the fact that such armatures rotate at speeds of several thousand revolutions per minute, the centrifugal forces tending to throw the end connections outward are, of course, very high. Although the retaining devices heretofore available do prevent complete dislodgment of the end connections, all of those with which I am familiar have had the common failing that they permitted some in and out movement of the end connections as the centrifugal forces were increased and decreased with changes in armature speed. The resulting repeated flexure of the end connections finally results in breaking the end connections themselves or their joints to the rotary connecter. In either case, the corresponding windings are open-circuited and in some cases short-circuited.

The general object of the present invention is to provide in an armature embodying energizing windings with end connections to a rotary connecter such as a commutator or slip ring, a novel arrangement for holding the end connections securely in place without any shifting or movement which would otherwise be occasioned by the strong centrifugal forces applied to them while the armature is rotating.

A more specific object is to provide an armature of the character indicated embodying a resilient member, such, for example, as a springy spiral strip, arranged within the bundle of end connections and acting at all times to press them outward tightly against a circumferential retainer so that even a high centrifugal force on the end connections cannot cause any additional outward movement of them.

Another object of the invention is to provide an armature of the character indicated embodying an improved end connection retainer which not only effectually prevents shifting or movement of the end connections but which is cheap to manufacture, easy to apply, requires a minimum number of simple parts and is readily adaptable to a wide variety of types of armatures.

Further objects and advantages of the invention will become apparent as the following description proceeds taken in connection with the accompanying drawing, in which.

Figure 1:
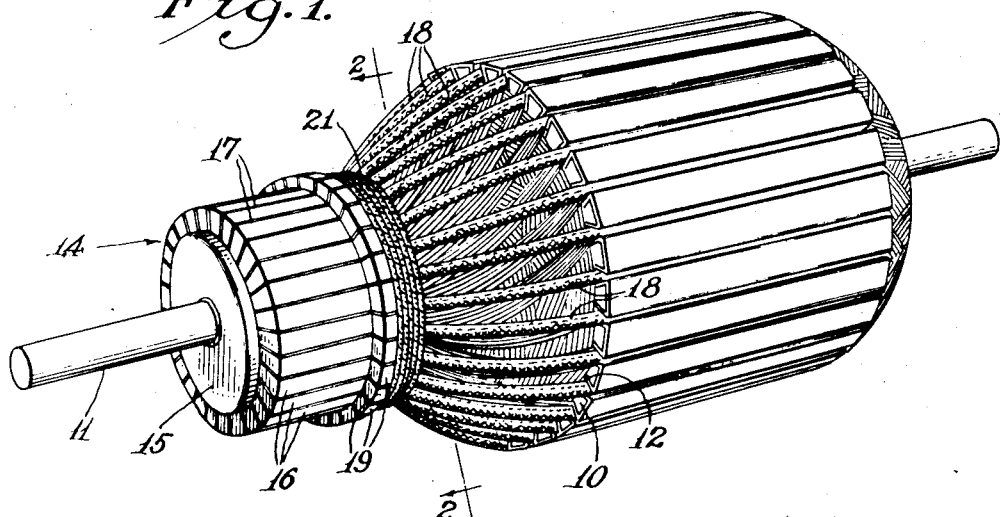
Figure 1 is a general perspective view of a rotatable dynamo electric machine armature embodying the invention.

For purposes of exemplification and explanation, the invention has been disclosed herein as embodied in a motor armature (Fig. 1) which, aside from the novel end connection arrangement, is of conventional form and hence does not require a detailed description as to the conventional parts. It will be apparent to those skilled in the art that the present invention is applicable to a wide variety of different types of armatures for dynamo electric machines. Accordingly, even though a particular embodiment of the invention has been shown and described in some detail, there is no intention to thereby limit the invention to such embodiment but on the other hand the appended claims are intended to cover all modifications and alternative constructions falling within the spirit and scope of the invention.

Figure 2:
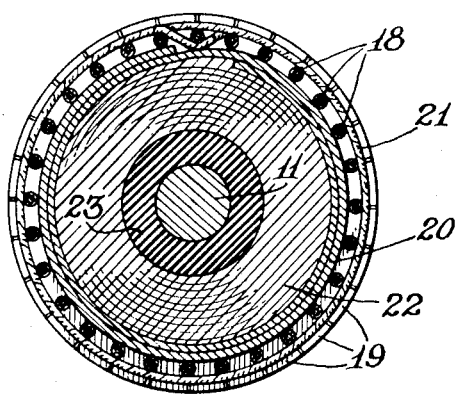
Fig. 2 is a transverse sectional view taken along the line 2—2 of Fig. 1.
Figure 3:
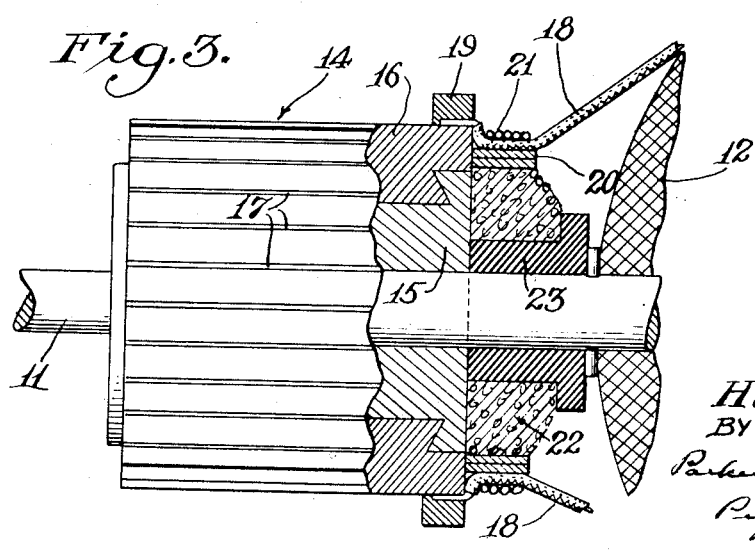
Fig. 3 is an enlarged side elevation of the front end portion of the armature in Fig. 1, partially in vertical section.

The armature illustrated (Fig. 1) embodies, in brief, the usual magnetic core 10 carried by a shaft 11 and having a slotted periphery in which are arranged windings 12. Fast on the shaft 11, at one end of the core 10, is a rotary connecter shown as a commutator 14. This commutator, in accordance with the usual practice, embodies an insulating hub 15 (Fig. 3) in which are set a series of electrically conductive commutator bars or segments 16 made of copper or the like and each insulated from the other by intervening insulating barriers 17. The terminals of the windings 12 are connected to corresponding commutator bars by insulated wires or end connections 18. These end connections are usually the extended ends of the wire making up each winding and are suitably joined to the commutator bars 16 by soldering their ends in slotted lugs 19 on the inner ends of the bars. The multiplicity of end connections 18 are arranged in a generally cylindrical bundle coaxial with the shaft 11 (Figs. 1 and 2) and extending generally axially of the armature.

In use the armature is journaled for rotation within a suitable stator structure (not shown) and in many types of machines is rotated at high speeds of several thousand revolutions per minute. During the lift of the machine the armature is, of course, started and stopped many thousands of times. The net result is a repeated application and removal of strong centrifugal forces tending to throw the end connections 18 outward. Heretofore, it has been the practice to encircle the bundle of end connections with a circumferential binding drawn as tightly as possible, with the object in view of positively holding the end connections against any outward displacement. Despite the initial tightness of the binding or retainer, it has been found, however, that it gradually becomes stretched or loosened and in many cases permits some play of the end connections even initially. Consequently, the end connections flex outward while the armature is running and then flex back as it decelerates. This alternate swelling and collapsing or "breathing" of the bundle of end connections finally results in breakage of the end connections themselves or of their joints with the commutator, and in some instances results in chafing away of the insulation on the end connections and finally short-circuiting of them.

The present invention comprehends a retaining arrangement for the end connections which depends upon a principle of operation exactly the antithesis of that for the arrangements heretofore utilized. Instead of depending upon a circumferential binding to define a fixed or unchanging limit of outward movement for the end connections—and which in actual practice does not remain fixed but gradually increases or else permits some movement of the end connections short of the limit position even in the initial installation—I utilize means for positively urging the end connections out against a peripheral binding or retainer at all times. By using this outward rather than inward pressure, if the circumferential retainer does become stretched, the end connections are still pressed out against it so that they have no room for play. Since the outward pressure is constantly applied by a means not dependent on centrifugal force, there is no relaxation of the pressure when the armature is at rest.

In the illustrative construction (Figs. 2 and 3), a resilient member 20 of spiral configuration is used to urge the end connections 18 constantly outward against a peripheral binding shown in the form of a cord 21 wound and tied about the bundle of end connections. The member 20 is preferably made of a strip of insulating material such as fiber so that there will be no danger of short-circuiting the end connections. With this expansible and springy member 20 located within the bundle of end connections 18, they are constantly urged outward against the binding 21. Consequently, even if the binding should stretch somewhat during use, the end connections 18 will always be retained tightly against it and cannot weave in and out as the armature stops and starts.

Figure 4:
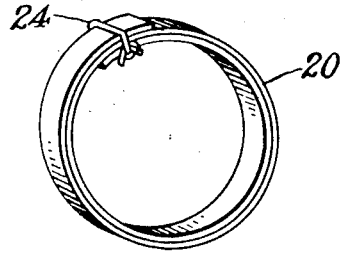
Fig. 4 is a detail perspective view of the resilient spiral retaining member included in the armature of Fig. 1.

In constructing the armature herein shown, a filler 22 (Figs. 2 and 3) made of cord of suitable material may be placed about a collar 23 on the armature shaft 11 at the inner end of the commutator 14. The resilient strip of fiber 20 is wound in spiral form about this filler and temporarily tied by a cord 24 (Fig. 4) so as to hold it during the remainder of the assembly operation. The end connections 18 are then soldered to the commutator lugs 19. When the entire bundle of end connections is in place, the retaining cord 21 is then wound about them as tightly as possible and firmly tied. Then the cord 24 on the resilient strip 20 is snipped so that the strip is free to spring outwardly a small amount and press the end connections 18 tightly against the binding 21. Thereafter, the armature assembly is, in accordance with the usual practice, repeatedly dipped in insulating compound and the latter baked.

From the foregoing it will be apparent that an armature has been provided which is especially adapted to meet the exigencies of use in high speed motors such as are used, for example, in percussion tools. Even though the external binding 21 may have some slight looseness when initially applied, the resilient strip 20 presses the end connections 18 firmly against it as soon as the strip is released by cutting its tie cord 24, so that from the very first the end connections 18 are held positively against any play or movement. Furthermore, any stretching or loosening of the binding 21 during continued use will still not permit of in and out flexure of the end connections 18 since the spiral member 20 will gradually expand with the expansion of the binding 21 and always keep the end connections pressed against the latter.

I claim as my invention:

1. In a rotatable armature for a dynamo electric machine embodying a plurality of windings and a rotary connecter connected to such windings by end connections extending between the windings and the rotary connecter, a retainer arranged to encircle said end connections for preventing their displacement radially of the armature due to centrifugal force, and means including an expansible resilient member disposed on said armature radially inward of said end connections for pressing the same snugly out against the binding.

2. In a rotatable armature for a dynamo electric machine embodying a plurality of windings and a rotary connecter connected to such windings by end connections extending between the windings and the rotary connecter, said end connections being led from said windings to said connecter in a generally cylindrical bundle coaxial with the axis of rotation, a retainer arranged to encircle said end connections for preventing their displacement radially of the armature due to centrifugal force, and means including a strip of resilient material wound in spiral configuration and located within said bundle of end connections for constantly urging them outward against said retainer.

3. In a rotatable armature for a dynamo electric machine the combination of a pair of elements spaced axially of the axis of rotation of the rotor, a plurality of electrical conductors extending generally axially of the rotor between said elements and arranged in a substantially cylindrical bundle coaxial with the rotor axis, a retainer arranged to encircle said conductors for preventing end displacement radially of the armature due to centrifugal force, and a spirally wound strip of resilient electrical insulating material located interiorly of said bundle of conductors and sprung out against the same to press them constantly against said retainer.

4. A rotatable armature for a dynamo electric machine embodying a plurality of electrical conductors extending generally axially of the rotor and encircled by a peripheral retainer, characterized by the provision of means for constantly and resiliently urging said conductors into engagement with said retainer.

HUGO M. ZSCHAU.